United States Patent
Starr et al.

(10) Patent No.: US 7,182,058 B2
(45) Date of Patent: Feb. 27, 2007

(54) EXHAUST MANIFOLD GASKET

(75) Inventors: George Starr, Fowlerville, MI (US); Takashi Okano, Pinckney, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 18 days.

(21) Appl. No.: 11/108,487

(22) Filed: Apr. 18, 2005

(65) Prior Publication Data

US 2005/0242523 A1    Nov. 3, 2005

Related U.S. Application Data

(60) Provisional application No. 60/563,497, filed on Apr. 19, 2004.

(51) Int. Cl.
*F02B 75/22* (2006.01)
*F02F 11/00* (2006.01)

(52) U.S. Cl. .................. 123/195 R; 277/313; 277/591; 277/592; 277/598

(58) Field of Classification Search ............ 123/195 R; 277/591–598, 637, 313
See application file for complete search history.

(56) References Cited

U.S. PATENT DOCUMENTS

| 4,688,809 | A | * | 8/1987 | Deppe | 277/594 |
| 5,022,661 | A | * | 6/1991 | Nakasone | 277/591 |
| 6,155,045 | A | | 12/2000 | Durr et al. | |
| 6,182,976 | B1 | * | 2/2001 | Maekawa et al. | 277/593 |
| 6,189,895 | B1 | * | 2/2001 | Yamada | 277/591 |
| 2003/0205865 | A1 | | 11/2003 | Bock | |

FOREIGN PATENT DOCUMENTS

JP    60125462 A  *  7/1985

* cited by examiner

*Primary Examiner*—Noah P. Kamen
(74) *Attorney, Agent, or Firm*—Robert L. Stearns; Dickinson Wright PLLC

(57) ABSTRACT

A multi-use gasket assembly includes at least two lobes each having a fluid-conveying opening with an associated axis. Four mounting holes are formed in each of the lobes about the openings. The gasket has symmetry across a plane of symmetry containing the axes of the openings.

7 Claims, 5 Drawing Sheets

EXHAUST MANIFOLD GASKET

This application claims priority to U.S. Provisional Patent Application Ser. No. 60/563,497, filed Apr. 19, 2004.

BACKGROUND OF THE INVENTION

1. Field of the Invention

The subject invention generally relates to an exhaust manifold gasket for use in an automotive exhaust system. More specifically, the subject invention relates to an exhaust manifold gasket that is adaptable for installation on a variety of engines.

2. Description of the Related Art

It is known that automotive exhaust systems interface with an engine to convey exhaust gas away from cylinders in the engine. More specifically, an exhaust manifold is mounted to a cylinder head of the engine, and receives the exhaust gas as the exhaust gas exits the cylinder head.

Exhaust manifold gaskets are known in the art. Exhaust manifold gaskets seal the exhaust manifold to the cylinder head. The exhaust manifold gaskets prevent the exhaust gas from escaping, which could create noise, cause heat damage to components in the engine compartment, and/or create environmental issues. The exhaust manifold gaskets, which are also characterized as hot static seals due to the high temperatures that the exhaust manifold gaskets are required to withstand (up to 600° C. and higher), are often made of one or more layers of steel. Some auto manufacturers impose additional specification requirements. For example, some manufactures require that an anti-friction coating, which is also heat resistant, be applied on a side of the exhaust manifold gasket that is in contact with the exhaust manifold. The anti-friction coating enables slight movement of the exhaust manifold with respect to the engine to optimize the seal between the exhaust manifold and the cylinder head.

For engines having a V-shaped structure, two cylinder heads are arranged on opposite sides of the engine, due to the location of the cylinders. Thus, the exhaust system is required to have two separate exhaust manifolds on opposite sides of the engine, which requires two respective exhaust manifold gaskets. Fasteners are configured for the exhaust manifolds on the opposite sides of the engine to be generally mirror images of each other, which presents a number of problems for manufacturers of components for the exhaust system, in particular the exhaust manifold gaskets. For example, as described in further detail below, the exhaust manifold gasket must be flipped to be installed on the opposite sides of the engine, i.e., a different surface of the gasket faces the exhaust manifold on the opposite sides of the engine. As a result, both sides of the exhaust manifold gasket must be coated with the anti-friction coating.

Exhaust manifold gaskets are generally configured to have a series of mounting holes, each for receiving a fastener on the engine. Referring to FIG. 1, a conventional exhaust manifold gasket is disclosed. With this prior art exhaust manifold gasket, the mounting holes are diagonally spaced on each side of the exhaust manifold gasket and match a configuration of fasteners on the engine. More specifically, the exhaust manifold gasket defines multiple openings. The openings are defined along an axis A. One mounting hole is defined on each side of each opening. The mounting holes for each opening are arranged diagonally across the opening such that an axis B between the mounting holes intersects the axis A between the openings at a non-perpendicular angle. Because no complementary set of holes exist, the exhaust manifold gasket must be flipped during installation to fit the opposite side of the engine.

However, for the exhaust manifold gasket described above, one surface of the exhaust manifold gasket faces the exhaust manifold on one side of the V-shaped engine, and an opposite surface of the exhaust manifold gasket faces the exhaust manifold on the other side of the engine. As such, the entire exhaust manifold gasket must be coated with the anti-friction coating, even though the coating is only required for the surface that is in contact with the exhaust manifold. Anti-friction coatings are relatively costly. Therefore, coating both sides of the exhaust manifold gasket is more expensive than coating only one side of the exhaust manifold gasket.

Thus, there is an opportunity to overcome the deficiencies of the related art and lower the cost of the exhaust manifold gasket.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, an exhaust manifold gasket is shown generally at 10. The exhaust manifold gasket 10 is adaptable for installation on engines 12 preferably having a V-shaped configuration. However, it is also to be appreciated that the exhaust manifold gasket 10 may be installed on engines that have various other configurations, including, but not limited to, in-line engines.

Figure 1:
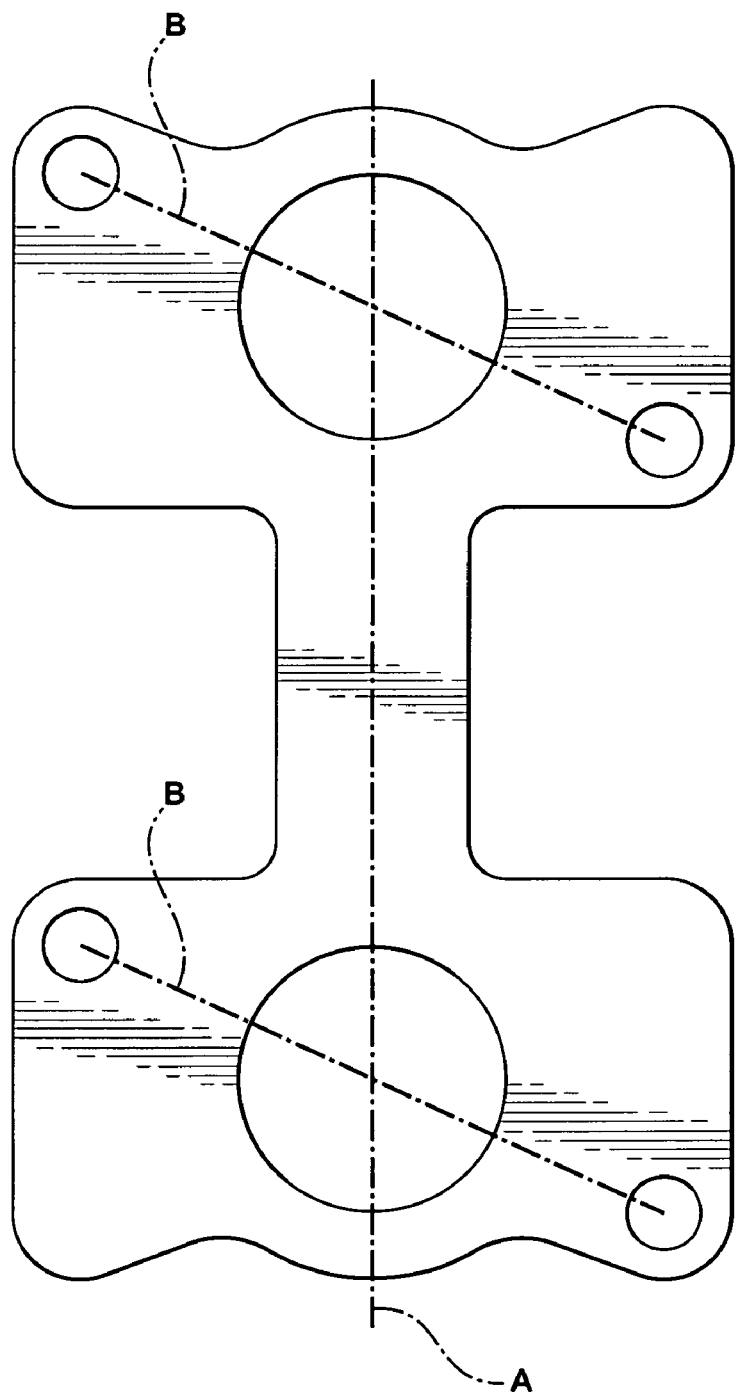
FIG. 1 is a plan view of a exhaust manifold gasket of the prior art.
Figure 2:
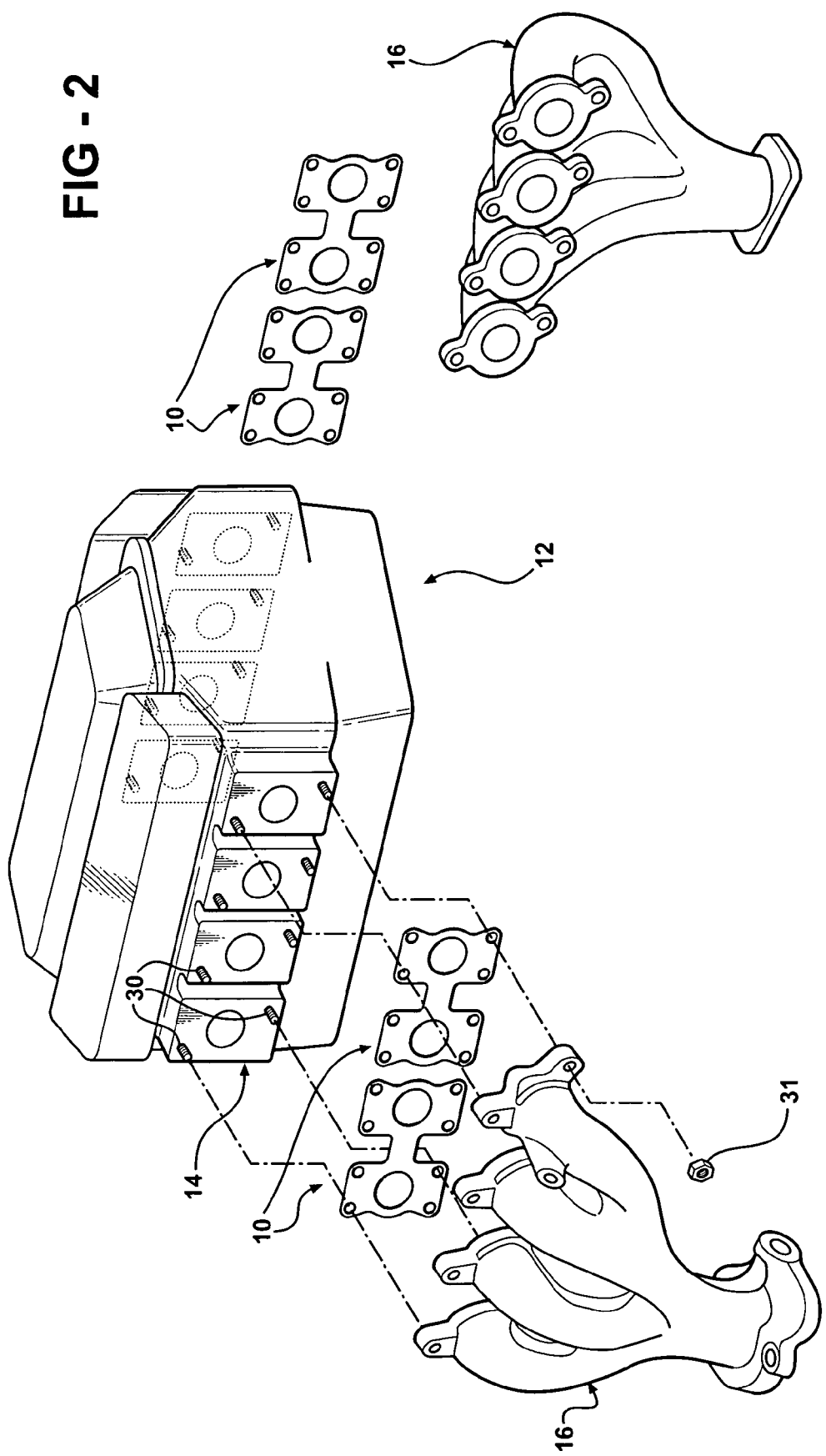
FIG. 2 is a partially exploded perspective view of an engine, an exhaust manifold, and an exhaust manifold gasket of the subject invention.

Referring to FIG. 2, an exhaust manifold 16 is mounted to a cylinder head 14 of the engine 12, and receives the exhaust gas as the exhaust gas exits the cylinder head 14. The exhaust manifold 16 conveys the exhaust gas through the exhaust system. The V-shaped engine 12 also includes a second cylinder head that is not shown. A second exhaust manifold, also not shown, is mounted to the second cylinder head. Fasteners 30 are configured on each side of the engine 12 for mounting the exhaust manifold 16 and the second exhaust manifold to the engine 12. Preferably, the fasteners 30 are bolts, with a nut 31 securing the exhaust manifold gasket 10 and the exhaust manifold 16 to the engine 12. The configuration of fasteners 30 on one side of the engine 12 may be a mirror image of the configuration of fasteners (not shown) on the other side of the engine 12. Due to the design of the exhaust manifold gasket 10, however, the same side of the exhaust manifold gasket 10 will face the exhaust manifold 16 no matter which side of the engine 12 the exhaust manifold gasket 10 is installed on. The significance of this feature of the exhaust manifold gasket 10 of the present invention will be discussed in further detail below.

The exhaust manifold gasket 10, also known as a hot static seal 10, has an anti-friction coating 11. The anti-friction coating 11, which is heat resistant, is preferably applied to a surface 13 of the exhaust manifold gasket 10 that is to be in contact with the exhaust manifold 16. The anti-friction coating 11 preferably includes molybdenum or compounds including molybdenum, such as molybdenum disulfide, which provides excellent anti-friction properties. However, other anti-friction coatings may be used.

The exhaust manifold gasket 10 may be made of embossed steel, high-temperature fiber material, graphite, ceramic composites, or any other type of material commonly used for exhaust manifold gaskets in the exhaust system. Furthermore, the exhaust manifold gasket 10 may include multiple layers.

Figure 3A:
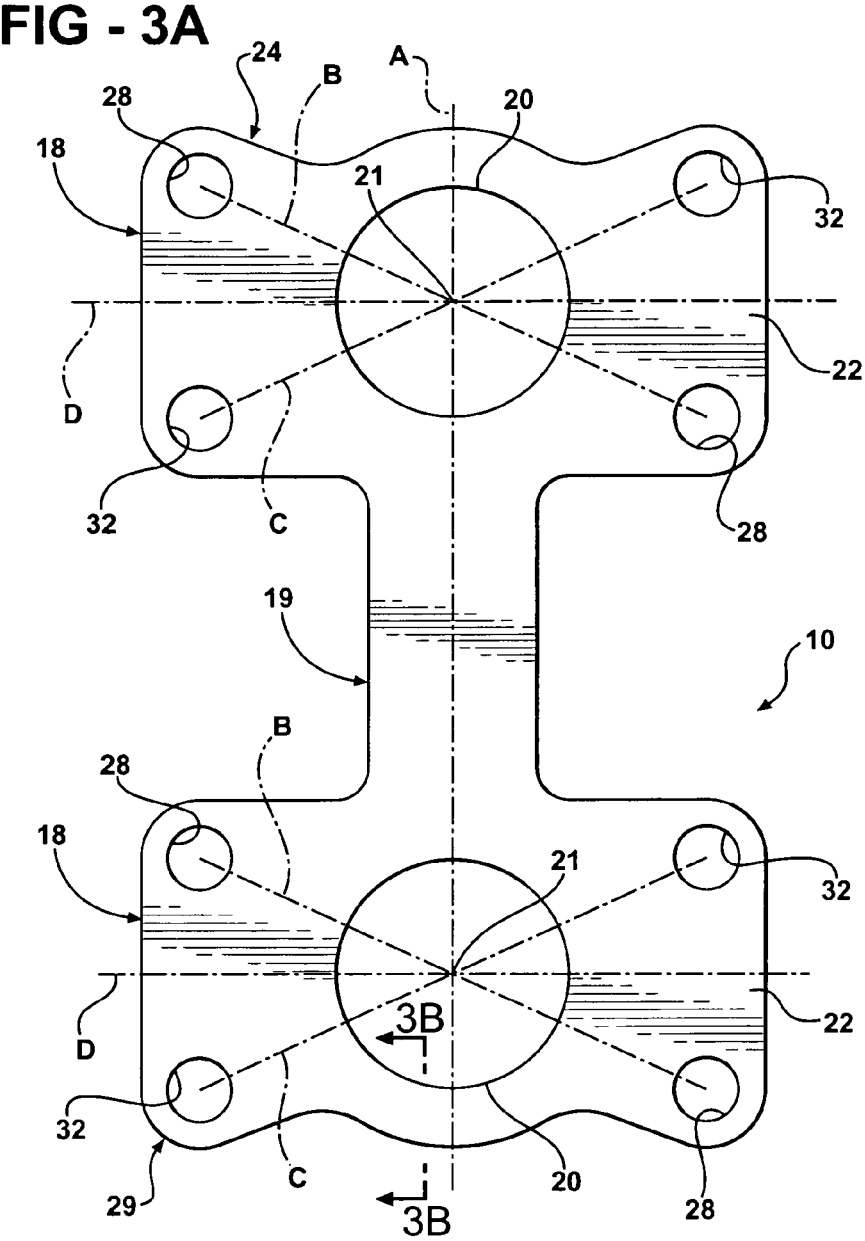
FIG. 3*a* is a plan view of a first embodiment of the exhaust manifold gasket.
Figure 4:
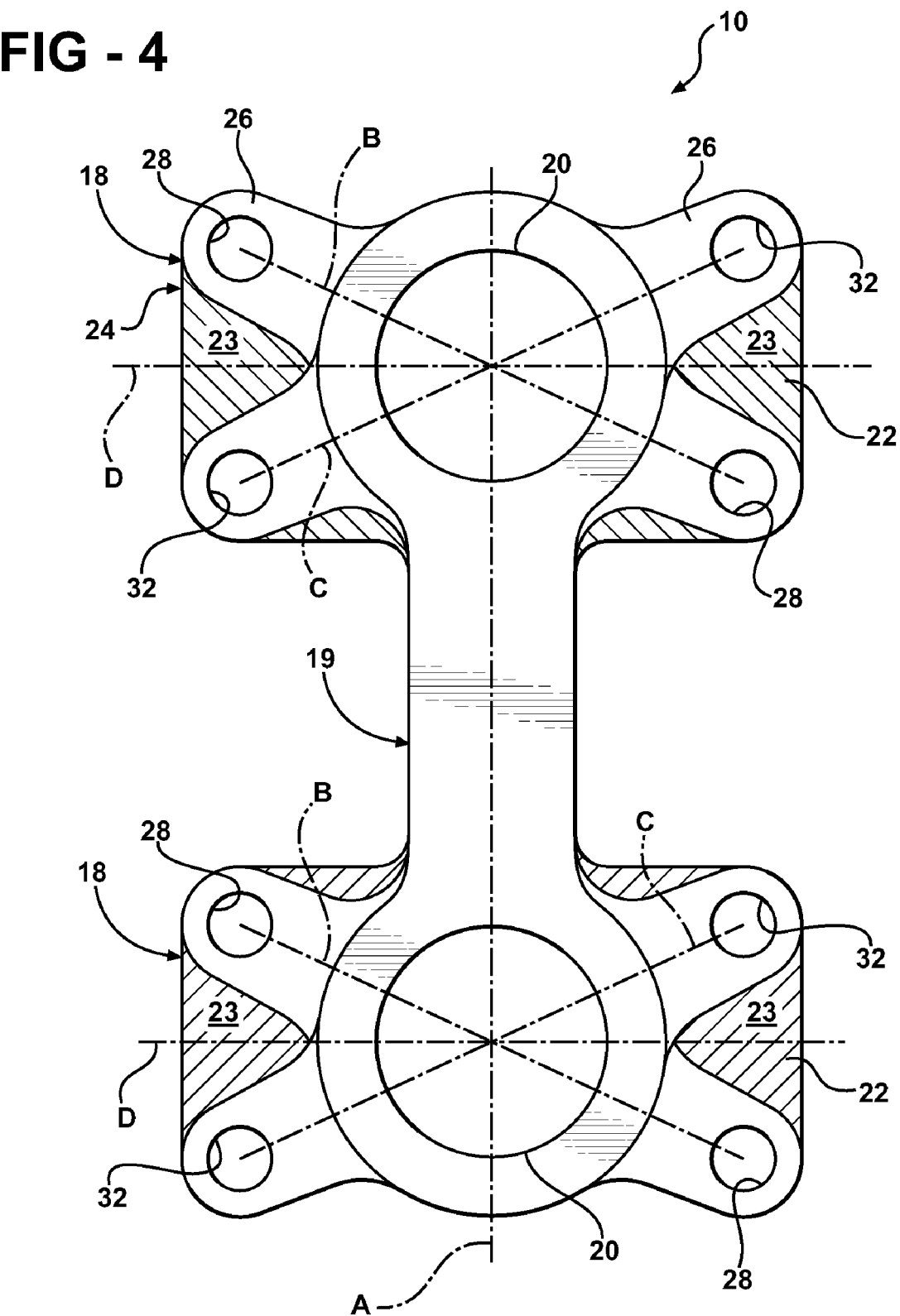
FIG. 4 is another plan view of the exhaust manifold gasket of FIG. 1.

Referring to FIGS. 3a and 4, the exhaust manifold gasket 10 defines an opening 20 having an axis 21 for allowing the exhaust gas to pass from the cylinder head 14 to the exhaust manifold 16. The opening 20 lies along an axis A of the gasket 10. Preferably, the exhaust manifold gasket 10 has at least two lobes 18, with each lobe defining one opening 20. However, it is to be appreciated that the exhaust manifold gasket 10 may only include one lobe 18. The lobes 18 may be separated by relatively narrower neck regions 19.

Figure 5:
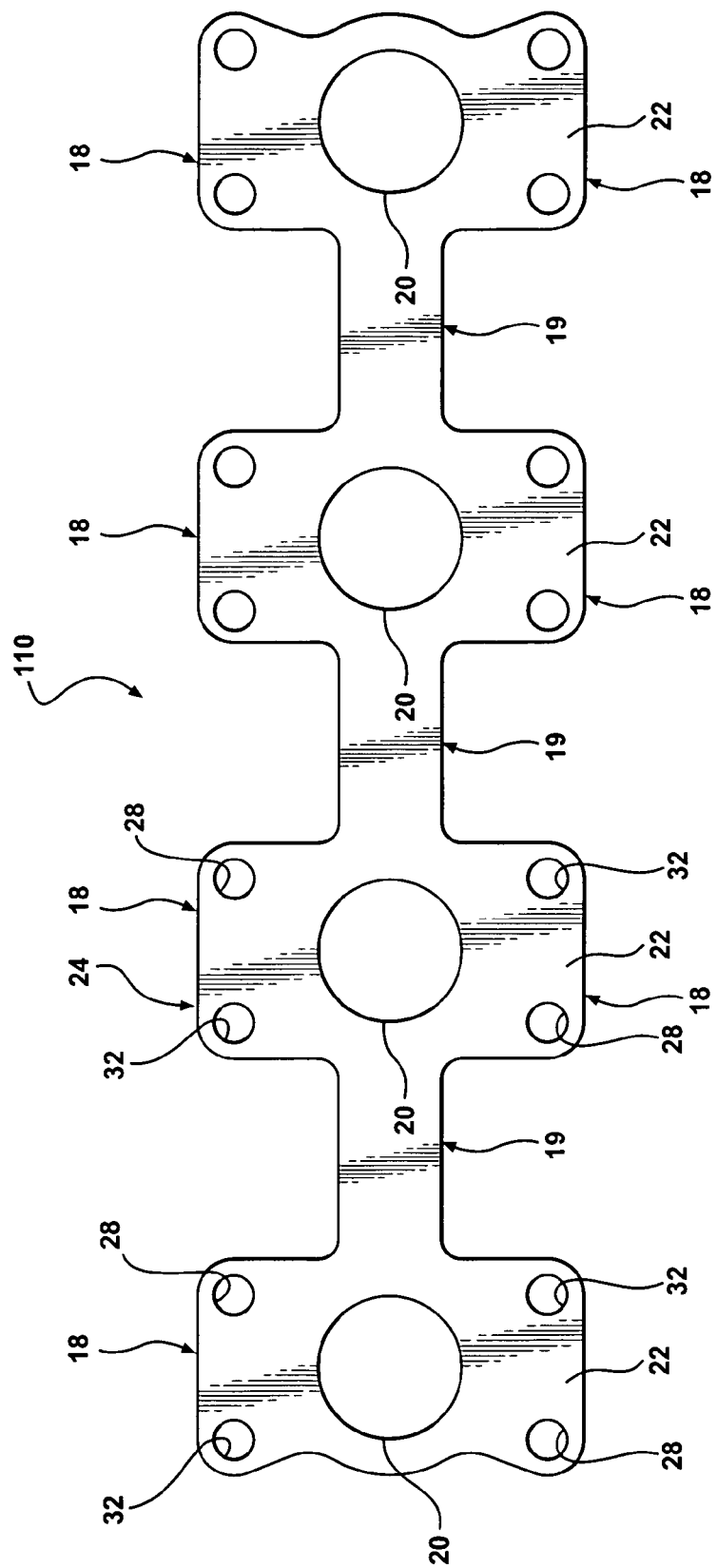
FIG. 5 is a plan view of another embodiment of the exhaust manifold gasket.

As shown in FIG. 2, two separate exhaust manifold gaskets 10 may be installed on the engine 12. Alternatively, as shown in FIG. 5, another exhaust manifold gasket 110 defining four openings 20 may be installed on the engine 12.

Each lobe 18 includes an apron 22 that suffounds each opening 20 for facilitating attachment of the exhaust manifold gasket 10 to the engine 12. More specifically, the exhaust manifold gasket 10 is produced from a blank. The blank is preferably stamped out of a sheet of material and has an outer perimeter 24, which preferably remains unchanged in the final exhaust manifold gasket 10, which is shown in FIG. 3a. Alternatively, excess portions 23 of the apron 22, which are crosshatched in FIG. 4, may be trimmed off, leaving tabs 26 extending from the openings 20. However, since the excess portions 23 do not affect attachment of the exhaust manifold gasket 10 to the engine 12 and require additional processing to remove, it is preferred that the excess portions 21 remain on the exhaust manifold gasket 10.

Figure 3B:
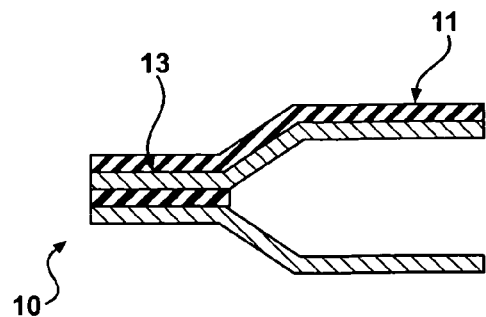
FIG. 3*b* is a cross-sectional side view of a portion of the exhaust manifold gasket of FIG. 3*a*.

Referring to FIG. 3b, a cross-section of the exhaust manifold gasket 10 is shown. The exhaust manifold gasket 10 preferably has two layers which separate around the opening 20.

A first set of mounting holes 28 is defined in the apron 22 surrounding each opening 20. The mounting holes 28 receive a stud or a fastener (e.g., a bolt) 30. The mounting holes 28 are diagonally spaced on each side of the opening 20, i.e., with one hole 28 defined on each side of each opening 20. The mounting holes 28 correspond to the configuration of studs 30 on one side of the engine 10. The mounting holes 28 are spaced such that a line B between the mounting holes 28 intersects the axis A between the openings 20 at a non-perpendicular angle.

A second set of mounting holes 32 is also defined in the apron 22 surrounding each opening 20. Like the first set of mounting holes 28, the second set of mounting holes 32 are diagonally spaced on each side of the opening 20. The second set of mounting holes 32 are symmetrical to the first set of mounting holes 28 about an axis D passing through a center of the opening 20. Furthermore, the mounting holes 32 are spaced such that a line C between the mounting holes 32 intersects the axis A at a non-perpendicular angle. The position of the second set of mounting holes 32 enables the same exhaust manifold gasket 10 to be installed on the other side of the engine 12 such that the surface 13 of the exhaust manifold gasket 10 facing the exhaust manifold 16 remains the same on each side of the engine 12. In other words, the exhaust manifold gasket 10 may be simply installed on each side of the engine 12 without flipping the exhaust manifold gasket 10. As such, the gasket 10 has reflective symmetry across a longitudinal plane of symmetry containing the axis.

Due to the two distinct sets of mounting holes 28, 32, and also due to the diagonal spacing of each mounting hole 28, 32, the exhaust manifold gasket 10 is designed such that the surface 13 is in contact with the exhaust manifold 16 regardless of whether the configuration of studs 30 is identical or a mirror image from one side of the engine 12 to the other. As a result, the relatively expensive anti-friction coating is only required on one side 13 of the exhaust manifold gasket 10 to reduce the cost of manufacturing the exhaust manifold gasket. In addition, the exhaust manifold gasket 10 provides for ease of installation on the engine 12 since flipping is not required to install the exhaust manifold gasket 10 on the engine 12.

Obviously, many modifications and variations of the present invention are possible in light of the above teachings. The invention may be practiced otherwise than as specifically described within the scope of the appended claims.

What is claimed is:

1. An engine comprising:
   two banks of fluid-conveying openings to be sealed;
   two mounting bolt configurations different from one another, one of said bolt configurations associated with a one of said banks of fluid-conveyng openings; and
   a pair of identically configured gaskets each formed with a plurality of openings associated with said fluid-conveying openings of said engine block and each having two sets of mounting holes, one set of which conforms to one of said mounting bolt configurations, and the other set of which conforms to the other of said mounting bolt configurations.

2. The engine of claim 1 wherein each of said gaskets further comprises:
   a gasket body having at least two lobes each of said at least two lobes having an opening with an associated axis;
   four mounting holes formed in each of said lobes about said respective openings; and
   wherein each of said gaskets has reflectional symmetry across a longitudinal plane of symmetry containing said axes of said openings.

3. The engine of claim 2, wherein said gasket body includes a relatively narrower neck region connecting said at least two lobes.

4. The engine of claim 1 wherein said gasket body includes coating of low friction material applied to only one surface of said gasket body.

5. A method of providing a seal in an engine block, comprising:
- preparing first and second gaskets of identical construction each having at least a part of fluid-conveying openings, and each gasket having a first set of mounting holes and a second set of mounting holes;
- mounting the first gasket on one part of the engine using the first set of mounting holes; and
- mounting the second gasket on another part of the engine using the second set of mounting holes; wherein the mounting of the first gasket leaves free the second set of mounting holes of the first gasket, and where the mounting of the second gasket leaves free the first set of mounting holes of the first gasket.

6. The method of claim 5 wherein each of the gaskets is formed so as to be symmetrical across a plane of symmetry containing the axes of the openings.

7. The method of claim 5 including fabricating the gaskets of metal.

* * * * *

UNITED STATES PATENT AND TRADEMARK OFFICE
CERTIFICATE OF CORRECTION

PATENT NO. : 7,182,058 B2 Page 1 of 1
APPLICATION NO. : 11/108487
DATED : February 27, 2007
INVENTOR(S) : Starr et al.

It is certified that error appears in the above-identified patent and that said Letters Patent is hereby corrected as shown below:

Column 3, line 34: "an apron 22 that suffounds" should be --an apron 22 that surrounds--.

Column 4, line 43: "banks of fluid-conveying openings" should be --banks of fluid-conveying--.

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,182,058 B2  Page 1 of 1
APPLICATION NO. : 11/108487
DATED : February 27, 2007
INVENTOR(S) : Starr et al.

It is certified that error appears in the above-identified patent and that said Letters Patent is hereby corrected as shown below:

Column 3, line 34: "an apron 22 that suffounds" should be --an apron 22 that surrounds--.

Column 4, line 43: "banks of fluid-conveying openings" should be --banks of fluid-conveying--.

Signed and Sealed this

Twenty-seventh Day of November, 2007

JON W. DUDAS
*Director of the United States Patent and Trademark Office*